E. C. LITCHFIELD & J. C. HARRIS.
MANURE SPREADER.
APPLICATION FILED MAY 22, 1908.
997,682.
Patented July 11, 1911.
2 SHEETS—SHEET 1.
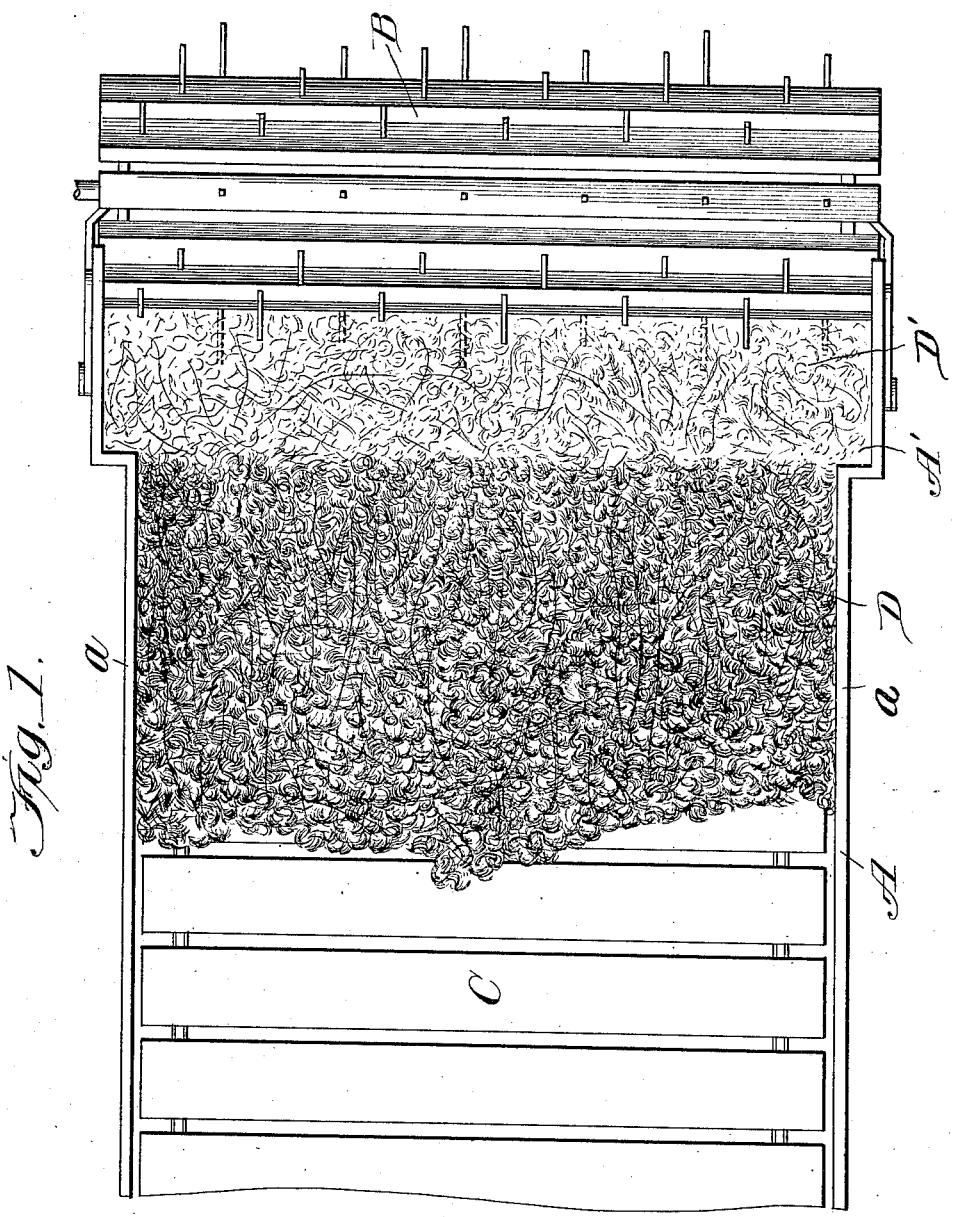

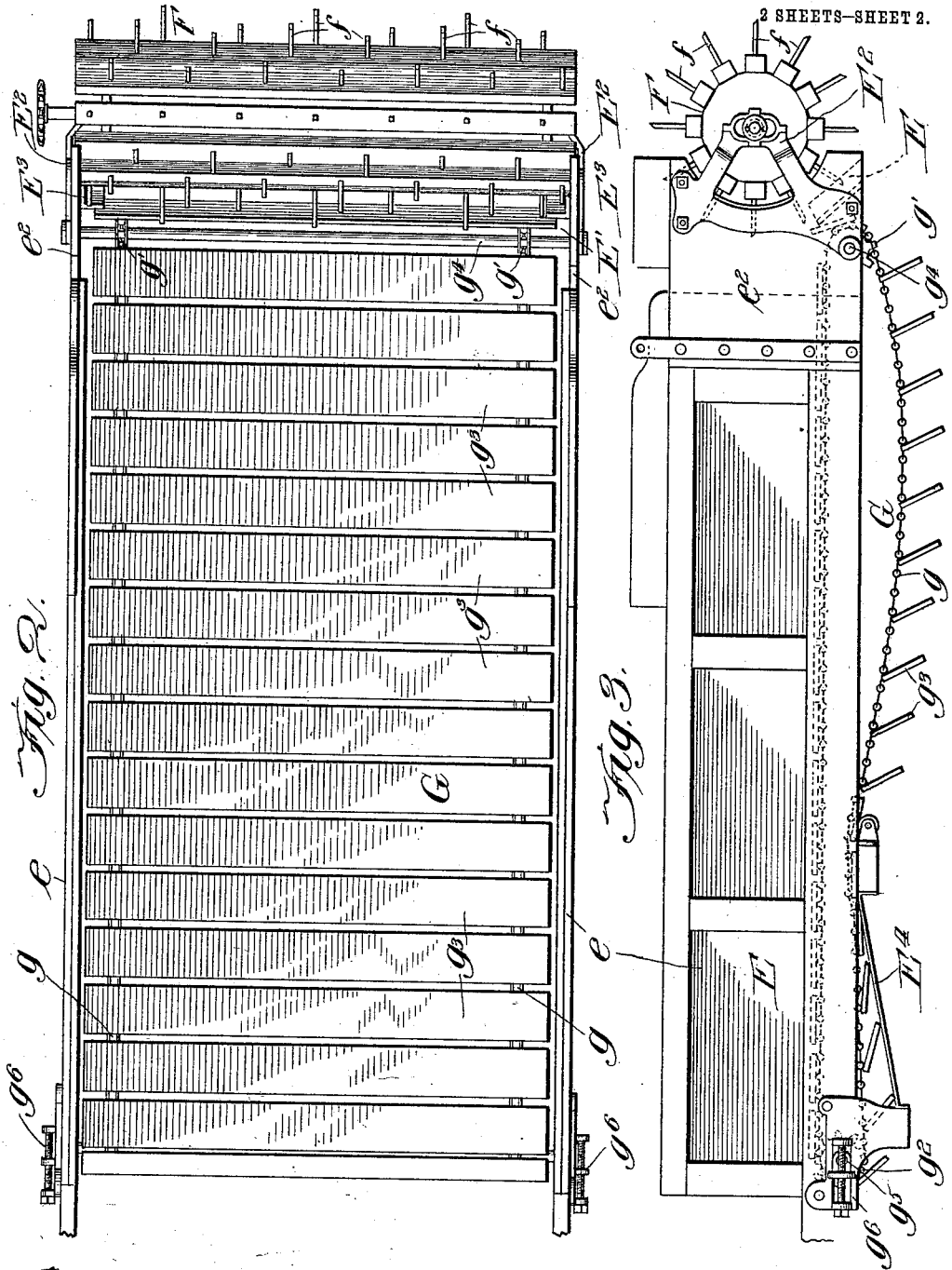

UNITED STATES PATENT OFFICE.

EDGAR C. LITCHFIELD AND JOHN C. HARRIS, OF WATERLOO, IOWA, ASSIGNORS TO THE LITCHFIELD MANUFACTURING COMPANY, OF WATERLOO, IOWA.

MANURE-SPREADER.

997,682. Specification of Letters Patent. Patented July 11, 1911.

Application filed May 22, 1908. Serial No. 434,248.

*To all whom it may concern:*

Be it known that we, EDGAR C. LITCHFIELD and JOHN C. HARRIS, citizens of the United States of America, and residents of Waterloo, Blackhawk county, Iowa, have invented certain new and useful Improvements in Manure-Spreaders, of which the following is a specification.

When a load of manure is carried a considerable distance over a rough road or even, with some kinds of material, a very short distance, the jarring and jolting of the wagon causes such load to settle and become quite dense in the wagon-box of the spreader. This solid settling of the load always exists whether the machine is being transported to the field or whether in operation while unloading in the field. There is another noteworthy cause for the packing and solidifying of the load in the ordinary form of manure spreader, and this is the conflicting forces due to the conveyer driving the load in one direction in opposition to the reaction of the rotating distributing-drum which tends to force the load in the opposite direction. These two forces acting in opposite directions, coupled with the settling of the load by gravity when the wagon is jolted, further packs and increases the density of the load as it comes in contact with the rotating distributing-drum. It often happens also that the manure is of a peculiarly adhesive and tenacious nature and lends itself readily to such process of consolidation so that as it comes in contact with the rotating distributing-drum, it becomes impossible for the teeth of said distributing-drum to penetrate and disintegrate this dense mass in a proper manner, resulting in large lumps being ejected without being properly disintegrated and oftentimes in the clogging of the machinery until it cannot move or until the friction becomes so great that the horses cannot operate it or the machine breaks.

The object of our invention is to obviate these faults in the ordinary type of spreader; and we accomplish our object by providing means for releasing the pressure upon the load immediately in advance of the teeth of the distributing-drum so that said teeth may enter the load when it is less dense and thus break it up and distribute it with minimum draft and without clogging or stopping the machine.

The various features of novelty which characterize our invention will be pointed out with particularity in the appended claims; but for a full understanding of the invention, and of its object and advantages, reference may be had to the following detailed description taken in connection with the accompanying drawings, wherein:

Figure 1 is a diagrammatic plan of the rear end of a manure spreader arranged in accordance with a preferred form of our invention, the spreader being indicated as partially filled with manure; Fig. 2 is a plan view of the spreader showing a form which it conveniently may take in actual practice; and Fig. 3 is a side elevation of the spreader shown in Fig. 2.

Referring to Fig. 1 of the drawings; A indicates the box or bed of a manure spreader; B, a distributing device in the form of a drum extending across the open rear end of the box or bed; and C a conveyer for feeding the manure toward the drum. At a point near and in advance of the drum the box or bed is abruptly widened as at A', the drum being preferably of such length as to extend entirely across this widened portion. Thus it will be seen that the manure D which is confined between the side walls *a, a,* of the box or bed as it is fed toward the distributing device is suddenly released, as it were, just ahead of the drum and spreads out and loosens, as at D', just as or a little before the teeth of the distributing device enter into it; so that the distributing device is permitted to act upon a broken and yielding body of material instead of being compelled to encounter a solid compact mass which may be wholly unyielding. Consequently the evils due to solidification or packing of the manure due, not only to material settling or to the pressure exerted in pushing it toward the distributing device, but also to the opposing forces of the distributing device and the feeding device in the ordinary spreader are entirely obviated; and the distributing device is enabled to spread the manure easily, without frictional loss, and without danger of clogging. Therefore the manure may be spread evenly, with a minimum expenditure of power and without the inconvenience to the operator or damage to the apparatus which often arises through clogging in the ordinary spreader.

The length of the widened portion should of course not be great enough to give the manure time to fill the enlarged space and again form a solid mass before it is brought under the influence of the distributing device. In other words, the widened space must be short enough to allow the manure to maintain its loosened condition until it has been thrown out of the spreader by the distributing device.

In Figs. 2 and 3, we have illustrated a practical embodiment of our invention which has been found to be satisfactory. In these views, E is a bed or body which may be an ordinary wagon body. $e$, $e$ are the sides. $e^2$, $e^2$ are removable side pieces secured to and projecting rearwardly from the main side walls, these auxiliary side pieces extending the full height of the side walls. In practice a comparatively slight widening of the bed or box adjacent to the distributing device is usually sufficient and therefore the auxiliary side pieces $e^2$, $e^2$, may be attached directly to the outer surfaces of the sides $e$, $e$, thus increasing the width of the rear end of the box or bed by twice the thickness of one of the sides. F is a distributing drum having teeth $f$ on the periphery, the drum being journaled in plates $E^2$ directly in rear of the widened portion $E'$ of the bed or box. The ends of the teeth are spaced apart a short but sufficient distance from the front end of the enlarged space to provide for the relief of the side pressure on the load and consequently the expansion of the load immediately in advance of the distributing device without, however, allowing time for a re-packing or solidification of the load before it is discharged from the spreader by the distributing device. G is a feeding device for the manure, which may consist of an endless conveyer arranged in the bottom of the bed, and, if desired, forming the floor thereof. The conveyer is illustrated as made up of a pair of endless sprocket chains, $g$, $g$ passing over sprocket wheels $g'$, $g'$, at the rear end of the bed and sprocket wheels $g^2$, $g^2$, at the front end, together with wide slats $g^3$, connecting the chains together. The wheels $g'$, $g'$, are preferably carried by a shaft $g^4$ mounted in stationary bearings, while the sprocket wheels $g^2$, $g^2$, may be carried by a shaft $g^5$ mounted in adjustable bearings $g^6$, $g^6$, of any suitable types. By shifting the bearings $g^6$, $g^6$, the slack in the conveyer may be controlled. Where the slats are loosely connected to the chains as shown, shields $E^3$, $E^3$ may be arranged between the conveyer and the drum at the rear of the bed to prevent the slats from striking the drum. Furthermore, the conveyer may pass over ways $E^4$ beneath the front end of the bed, thereby preventing the front traction wheels (not shown) from striking the conveyer while turning a curve.

In operation the distributing-drum and the conveyer are actuated by any suitable means so as to cause the drum to rotate in the clock-wise direction (viewed as in Fig. 3) and the conveyer to travel over the bottom of the bed from front to rear. The conveyer feeds the manure toward the drum and, as it reaches the enlarged chamber, the solid mass of manure is progressively broken up and loosened, to be then thoroughly disintegrated by the revolving teeth and thrown rearwardly out of the spreader.

While we have illustrated and described in detail only one form of our invention, including a single type of feeding and distributing apparatus, we do not desire to be limited to this specific form or to the particular type of feeding and distributing apparatus, but intend to cover all of the various constructions and arrangements of parts coming within the terms of the definitions of our invention constituting the appended claims.

Having now fully described our invention, what we claim as new and desire to secure by Letters Patent is:—

1. In a manure spreader, a wagon box wherein the manure is caused to move toward one end, the wagon box being open at said end, disintegrating and discharging means located abreast the open end of the box so as to tear fragments of manure from a mass contained in said box and discharge them, and means immediately in advance of said disintegrating and discharging means for permitting the manure to loosen and spread laterally as it is engaged by said disintegrating and discharging means.

2. In a manure spreader, a wagon box, means for moving a mass of manure in said box toward one end thereof, disintegrating and discharging means located abreast of the latter end of said box so as to tear fragments of manure from the mass in the box and discharge them, and means immediately in advance of said disintegrating and discharging means for relieving the pressure upon the manure as it is impinged thereon.

3. In a manure spreader, a wagon box having a short widened portion at one end, means for moving a mass of manure in said box toward said widened portion, a disintegrating drum located abreast of said widened portion so as to tear fragments of manure from the mass in the box as it enters the widened portion and discharge them.

4. In a manure spreader, a wagon box wherein the manure is caused to move toward one end of the wagon box, the wagon box being open at said end, said wagon box having a short widened portion at the open end forming recesses at the sides of the box for relieving the side pressure on the contents of the box just as they approach said open end and permitting them to spread when impinged on a disintegrating drum, and a disintegrating drum located at and abreast of said opened end and arranged to disintegrate the manure at said end of the box and discharge it.

5. In a manure spreader, a wagon box having a short abruptly widened portion at one end, means for moving a mass of manure in said box toward and into said widened portion when the side pressure on the manure is released, a disintegrating drum located abreast of said widened portion and arranged to tear fragments of manure from the partially loosened mass delivered to it at said widened portion and discharge them.

6. In a manure spreader, a wagon box having a short widened portion at one end, a toothed disintegrating and discharging drum located abreast of said widened portion so as to tear fragments of manure from a mass contained in said box and discharge them, certain of the teeth of the drum extending into the additional space afforded by said widened portion at the sides of the box.

7. In a manure spreader, a wagon box provided with means for conveying the contents toward one end of same, a short widened space formed by abruptly widening said box near said end, a revolving toothed cylinder for acting on said contents in the box as they move into said widened space, said cylinder located abreast of said widened end and revolving in such direction that the surface when coming in contact with the contents of the box shall move in an upward direction.

Signed at Waterloo, Iowa, this 15th day of May 1908.

EDGAR C. LITCHFIELD.
JOHN C. HARRIS.

Witnesses:
E. D. STOVER,
RAY HOLDIMAN.

Copies of this patent may be obtained for five cents each, by addressing the "Commissioner of Patents, Washington, D. C."